United States Patent [19]

Kwon et al.

[11] Patent Number: 4,496,195
[45] Date of Patent: Jan. 29, 1985

[54] RECIRCULATING BEARING ASSEMBLY

[75] Inventors: Ki C. Kwon, Charlotte; Thomas A. Luther, Matthews, both of N.C.

[73] Assignee: The Bendix Corporation, Southfield, Mich.

[21] Appl. No.: 444,292

[22] Filed: Nov. 24, 1982

[51] Int. Cl.³ ............................................. F16C 29/06
[52] U.S. Cl. .................................................. 308/6 C
[58] Field of Search ............... 308/6 R, 6 B, 6 C, 216, 308/3 R, 3 A

[56] References Cited

U.S. PATENT DOCUMENTS

| 3,246,933 | 4/1966 | Better | 308/6 C |
|---|---|---|---|
| 3,645,588 | 2/1972 | Pepi | 308/6 C |
| 3,758,176 | 9/1973 | Stapely | 308/6 C |
| 4,432,587 | 2/1984 | Bryan | 308/6 C |

FOREIGN PATENT DOCUMENTS 2747841  5/1979  Fed. Rep. of Germany ...... 308/6 C
1302026  1/1973  United Kingdom ............... 308/6 C Primary Examiner—Stuart S. Levy
Assistant Examiner—David Werner
Attorney, Agent, or Firm—Kenneth A. Seaman; Raymond J. Eifler

[57] ABSTRACT

A recirculating bearing assembly and method of making it in which the bearing assembly includes a bearing path-defining structure having two primary pieces, the first being an elongated "I" shaped member having an internal aperture extending through the elongated length and having integral end bearing returns formed as concave, inwardly facing rounded portions in each of the cross pieces terminating the elongated length and the second piece including flat upper and lower surfaces and fit within the aperture and having generally parallel upper and lower surfaces connected by rounded end portions. The second member defines the internal surface of each of two races for roller bearing elements.

4 Claims, 9 Drawing Figures

RECIRCULATING BEARING ASSEMBLY

BACKGROUND OF THE INVENTION

1. Technical Field

The present invention relates to improvements in a recirculating bearing assembly and an improved method of making such a bearing assembly. In particular, the present invention is directed to a linear recirculating bearing of the type having reduced skewing or forces in a direction perpendicular to the direction of bearing assembly movement.

2. Background Art

Various recirculating bearing assemblies are known in the prior art. One such system is shown in U.S. Pat No. 3,758,176 issued to Stapley and assigned to Sundstrand Corporation. The bearing assembly disclosed in that patent utilizes a central body having a cross-shaped cross section with roller elements in rolling engagement on both top and bottom of a horizontal cross member. Separate end caps at each end of this cross shaped body provide a roller return.

While the bearing shown in the Stapley patent is generally acceptable for most roller bearing application in terms of performance, several manufacturing challenges and resulting costs are inherent in the design. For example, the horizontal left and right portions of the cross on upper and lower surfaces must be machined to a high degree of flatness, parallelism and a uniform dimension between sides, but the intermediate vertical cross piece prevents machining as a single element in a single pass. Additionally, the separate manufacture of a pair of endcaps for each bearing requires manufacture and inventory of additional parts which, in the patent's design, are of different materials. This requires inventory and assembly costs. A similar bearing is shown in U.S. Pat. No. 3,608,985 issued to Swanson.

Other recirculating bearing designs are shown in U.S. Pat. Nos. 3,003,828 to Stark and 3,341,262 to Kalmanek which relate generally to linear recirculating bearings having a plurality of dumbbell-shaped roller elements in a single race. This type of recirculating bearing has a generally favorable performance characteristics. However, this bearing exhibits a certain amount of inherent skewing and resistance to rolling in the linear direction. This bearing is also relatively expensive to manufacture, based partially on the cost for the unconventionally-shaped rollers and the tolerances required.

Additionally, the dumbbell portions of the rollers must be uniform to a high degree both between the two ends and one to another in order to minimize skewing and resistance to rolling.

Many other examples of linear recirculating bearing assemblies are known in the prior art. Examples of such bearings are shown, for example, in U.S. Pat. Nos. 3,101,978 and 3,241,890. In such bearings, there are significant limitations either in the bearing cost or performance or ease of manufacture, or some combinations thereof.

Accordingly, bearing assemblies of the prior art have limitations, both in terms of performance and manufacturing costs. One key limitation in performance is the amount of skewing, or forces perpendicular to the axis of bearing movement, which the bearing exhibits when moved along its direction of movement.

DISCLOSURE OF THE INVENTION

The present invention is a recirculating bearing assembly and method of making it which overcomes the limitations and disadvantages of the prior art bearing assemblies, while providing low skewing.

The present invention is a linear recirculating bearing assembly in which the roller bearing element retaining frame includes two primary pieces, one having the shape of an "I" in its preferred embodiment with a central aperture extending therethrough and having rounded recesses in each of the integral end portions, the other piece being a track member inserted through the aperture in the first member. Two endless bearing races are formed, each being defined internally by the track member and externally the return for each is defined by the rounded recesses in the integral end portion. The body of the "I" shaped member medially separates the two races. Each race includes a plurality of roller elements which are retained along their outer edges within the bearing assembly by suitable sideplates and a top and bottom retainer, one of which may be formed integrally with the "I" shaped member.

The present invention reduces manufacturing and inspection costs and problems related to forming race surfaces to a high degree of flatness and parallelism. This is accomplished by making both races on at least one side (the load bearing side) merely portions of a larger piece.

The present invention has the advantageous effect that the portions of the two bearing races can be machined simultaneously with a single pass of a suitable but conventional machine tool such as a grinder, allowing the two races to be coplanar to a high degree of accuracy and parallel with the reverse surface at a lower cost. In some alternate embodiments, the track member includes one or more projections for mounting, enabling the mounting surface to be finished parallel to the load bearing surface on a single member.

The present invention also has the advantageous effect that, in heavy load-bearing designs requiring multiple bearings adjacent one another, a single track member may be made an appropriate width to serve as the track member for the multiple bearings.

The present invention has the additional advantageous effect that the resulting bearing has low friction and generally resists skewing, leading to a high quality, low cost bearing assembly.

Other objects and advantages of the present invention will be apparent to one skilled in the art, in view of the following description of the drawing and the description of the best mode for carrying out the invention.

BEST MODE FOR CARRYING OUT THE INVENTION

Figure 1:
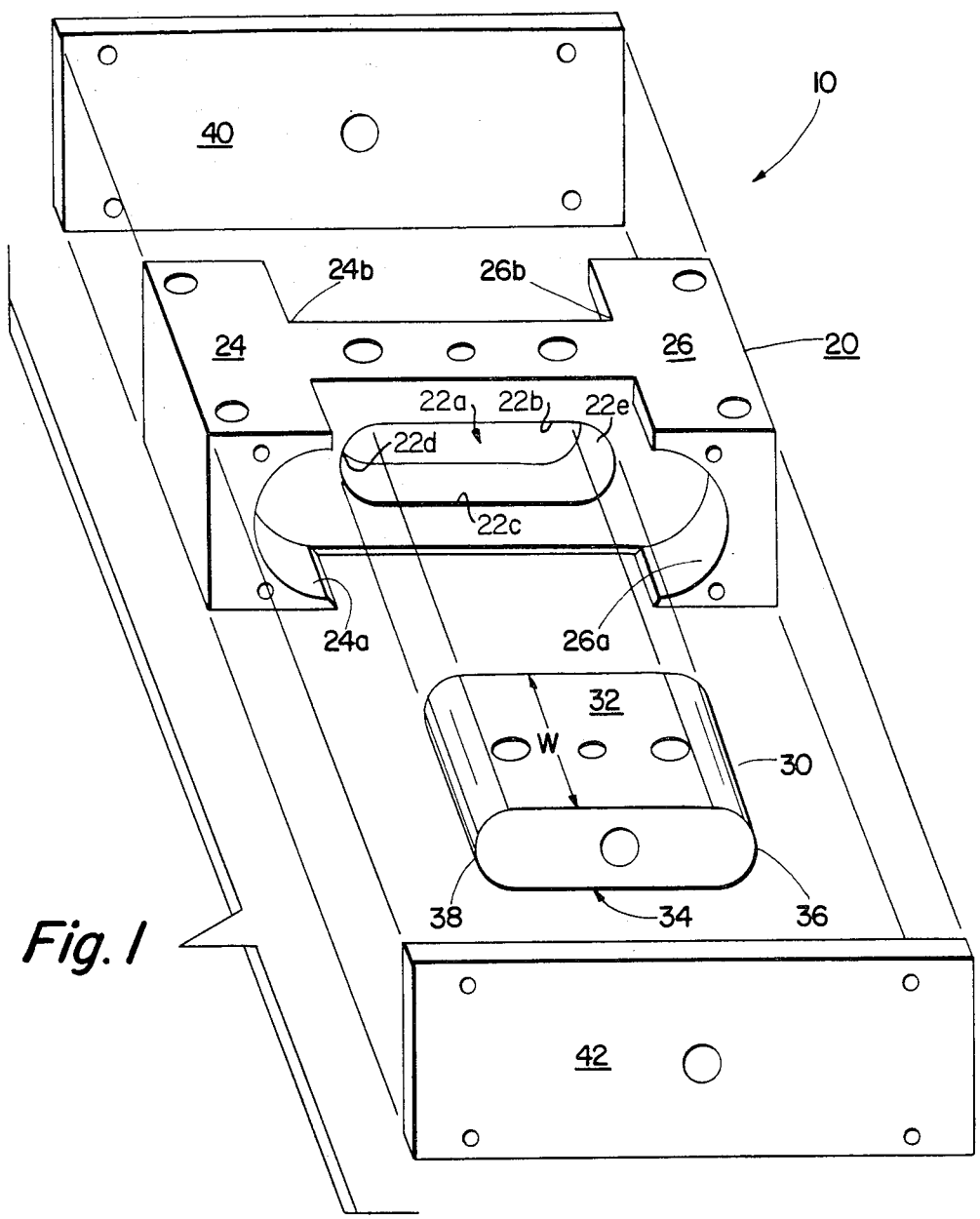
FIG. 1 is a perspective exploded view of a bearing assembly of the present invention, but prior to assembly of the roller bearing elements.

FIG. 1 is an exploded perspective view of a recirculating bearing assembly 10 including a one piece body or frame member 20 and a race member or bearing block 30. Side plates 40, 42 are also shown in this view, the side plates 40, 42 cooperate with the body or frame member 20 to form a housing.

The body member 20 of the bearing assembly of the preferred embodiment is in the shape of an "I" beam and includes a medial elongated section 22 and end portions 24, 26. The end portions 24, 26 form the upper and lower crosspieces of the "I" portion and the elongated medial body portion 22 sometimes referred to as a spine which connects the end portions 24, 26. The body member 20 is preferably a casting of suitable steel in its preferred embodiment, but the "elongated" reference to section 22 is not meant to imply any tensile elongation in the mechanical engineering sense.

The end portion 24 includes a first rounded concave portion 24a on one side of the medial body 22 and a second rounded portion 24b (not shown) on the other side of the medial body section 22. In a similar manner, the end portion 26 includes rounded concave portions 26a, 26b, one of which is located on either side of the medial body 22. The rounded portions 24a and 26a are substantially semi-circular and form returns for one race of bearings at either end of the race when the bearing assembly 10 is completely assembled, and the rounded end portions 24b, 26b form returns for a second bearing race. The medial portion 22 of the body member 20 is a uniform thickness for its intermediate extended length between the end portions 24, 26 making the two tracks parallel.

The medial body 22 has a central aperture or open ended recess 22a extending therethrough. The aperture 22a has a shape complementary to the race member 30 and receives the race member 30 therethrough when assembled. The aperture 22a is made in the form of a slotted hole with parallel upper and lower walls 22b and 22c and semicircular end portions 22d and 22e.

The race member or bearing block 30 has a generally uniform cross-section across its width W and has an upper surface 32, a lower or load surface 34 and rounded ends 36, 38. The upper surface 32 is finished to a required or desired level of flatness and to be parallel to the lower surface 34. The lower surface 34 is also finished to a desired degree of flatness. The upper surface 32 and the lower surface 34, together with the rounded ends 36, 38 define internal races for roller bearing elements (not shown) when assembled into the bearing assembly defined by the body member 20 and the race member 30. The race member 30 is a single member which in this embodiment supports two recirculating roller inpaths each referred to as a "track" or a "path"

The side plates 40, 42 are secured to either end of the body member and the race member by suitable attaching means, such as screws (not shown).

Figure 2:
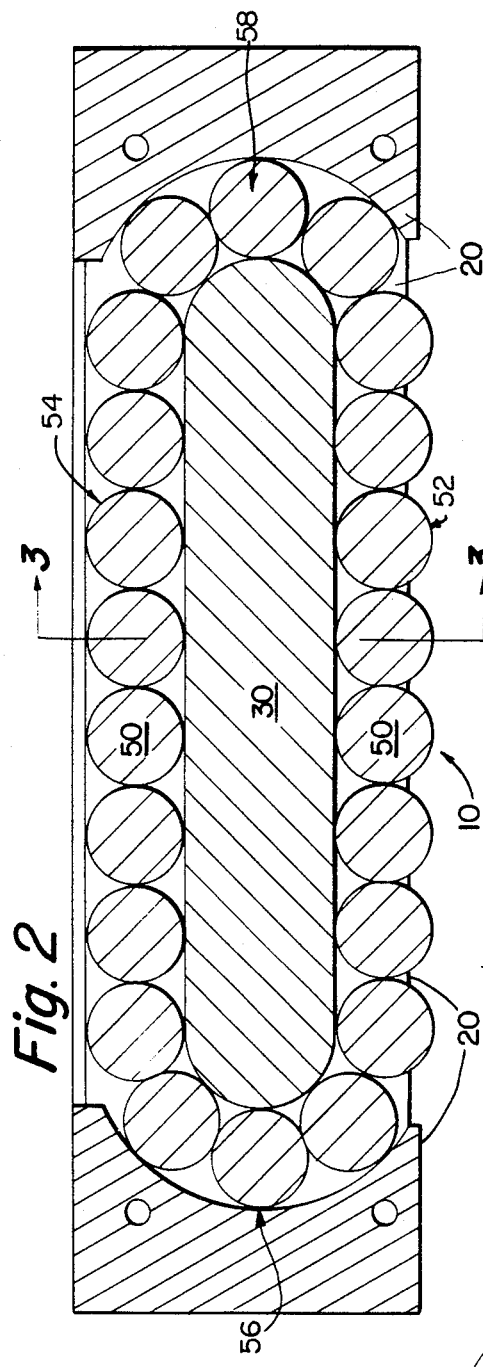
FIG. 2 is a longitudinal cross section of the bearing assembly of FIG. 1 assembled with roller bearing elements in place.

FIG. 2 shows the bearing assembly 10 with the body member 20 and the race member 30. Roller bearing elements 50 are assembled within the bearing assembly 10 and captivated by a retaining strip 44. Partially crowned rollers of the type having an external edge which has a rounded end and a tapered or chamfered surface on the internal edge (i.e., toward the "I" beam) are preferred for the roller bearing elements 50.

Figure 3:
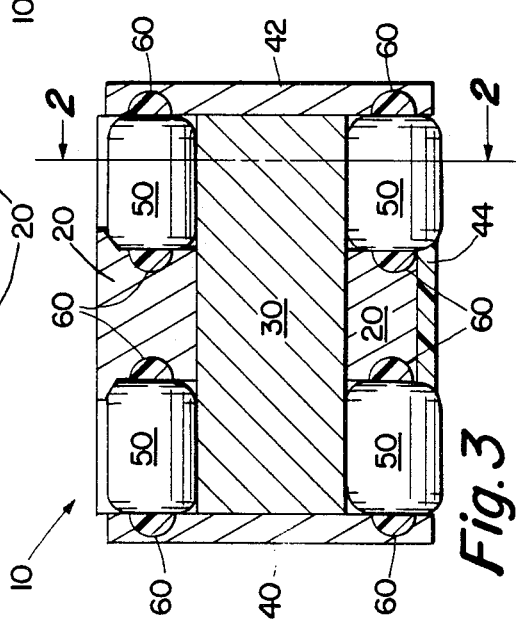
FIG. 3 is a cross section of the bearing assembly of FIG. 2, taken along the line 3—3 in FIG. 2 looking in the direction of the arrows.

FIG. 3 shows the roller bearing elements 50 in tracks defined by the body member 20 and the race member 30. The side plates 40, 42 are shown, along with the retaining strip 44. Additionally, on either side of the roller elements 50 an optional vibration damping strip 60 is shown to reduce vibration and resulting skewing and allow the bearing elements to be controlled in their lateral movement during linear movement of the assembly.

The retaining strip 44 is secured to the body member 20 after bearing elements 50 have been inserted and captivated within the bearing assembly 10, while allowing them to roll within the bearing pathways.

The bearing elements 50 are arranged in two circuitous arrays (see FIGS. 2 and 3) adjacent opposite sides of the bearing assembly 10. Each of the circuitous arrays of bearing elements includes a lower (as viewed in FIG. 2) linear group 52 of bearing elements having side surfaces which roll on a member, and upper linear group 54 of bearing elements which extends parallel to the lower group of bearing elements, and arcuate end groups 56 and 58 of bearing elements which extend between the upper and lower groups of bearing elements. Although only the right (as viewed in FIG. 3) group of bearing elements is shown in FIG. 2, it should be understood that the left (as viewed in FIG. 3) group of bearing elements has the same construction.

Figure 4:
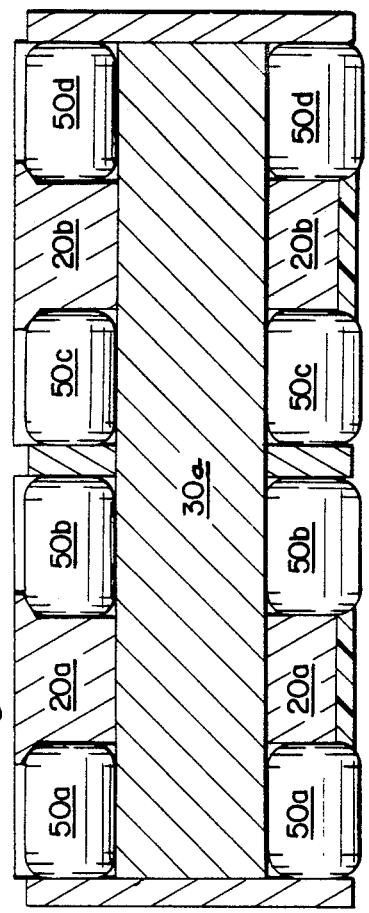
FIG. 4 is a cross sectional view of an alternate embodiment of the present invention, in which a single track member defines the internal race for multiple bearing housings.

FIG. 4 shows a bearing assembly 10' having greater stiffness, with the assembly 10' including two body members 20a, 20b with a single race member 30a extending through both body members 20a, 20b. Four tracks of bearing elements, 50a, 50b, 50c, 50d are shown in this view, although the number of tracks for passes might be expanded as necessary, limited only by the size of race member 30a which can be conveniently manufactured to specification and the number of body members which can be arranged and mounted in suitable array.

Figure 5:
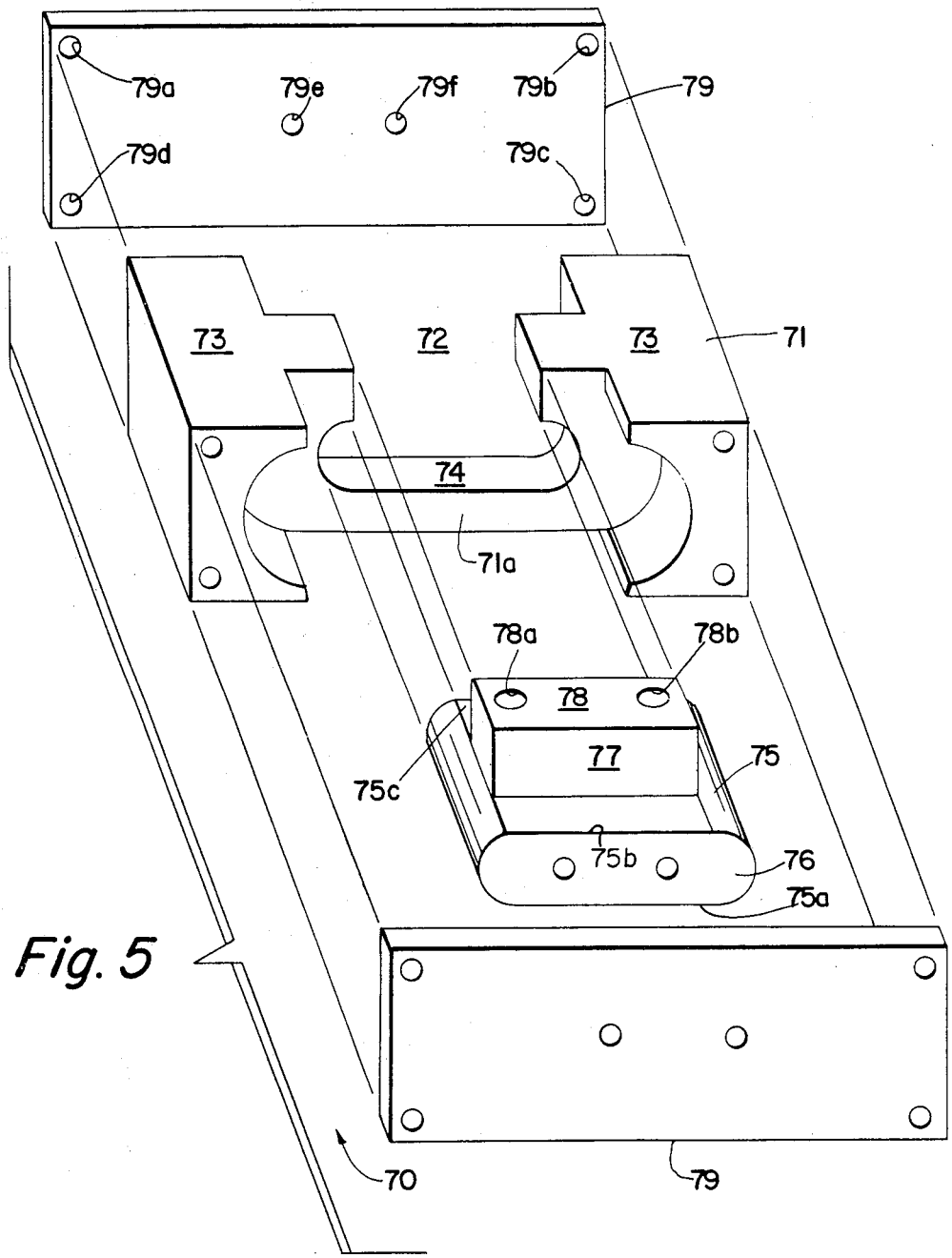
FIGS. 5–8 are exploded views of the main frame components for four alternate embodiments of frame, race, amd side plate constructions, but without roller bearing elements and retainers.

FIG. 5 is an alternate embodiment of a bearing assembly 70 similar to the bearing assembly 10 of FIGS. 1–3. The bearing assembly 70 includes a frame member 71 and a race member or bearing block 75, with a pair of side plates 79 which are similar to the side plates 42, 44 of FIGS. 1–3.

The frame member 71 is, in its preferred embodiment, a casting generally in the shape of an "I", but with an opening 72 along its top surface 73 and communicating with the race-receiving aperture or open ended recess 74.

The race member or bearing block 75 is formed generally in the shape of an inverted "T" where a horizontal cross portion or load section 76 is formed integrally with a vertical stem or mounting portion 77. The cross portion 76 defines the inside of both tracks on both upper and lower surfaces as in the embodiment of FIGS. 1–3. However, a spine 71a of the frame member 71 forms the divider medially between the two tracks only on the lower surfaces and around the two returns with the vertical stem portion 77 of the T-shaped race member 75 defining the medial divider between races along the upper surface. The stem portion 77 includes an upper surface 78 having mounting holes 78a, 78b therein for securing the race member 75 directly to a moving member. A bottom or load surface 75a of the race member 75 is the load bearing surface, and the bottom surface 75a is ground to a high degree of a flatness and parallel to the upper surface 78. The upper surfaces 75b, 75c are non-load-bearing surfaces.

The side plates 79 include holes 79a, 79b, 79c, 79d near the corners thereof for securing the side plate 79 to the frame 71, as in the embodiment of FIGS. 1-3. The side plate 79 includes two holes 79e, 79f which may be required in the embodiment of FIGS. 1-3 for securing the race member 75 to the side plates 79 to prevent pivoting of the race member 75.

Figure 6:
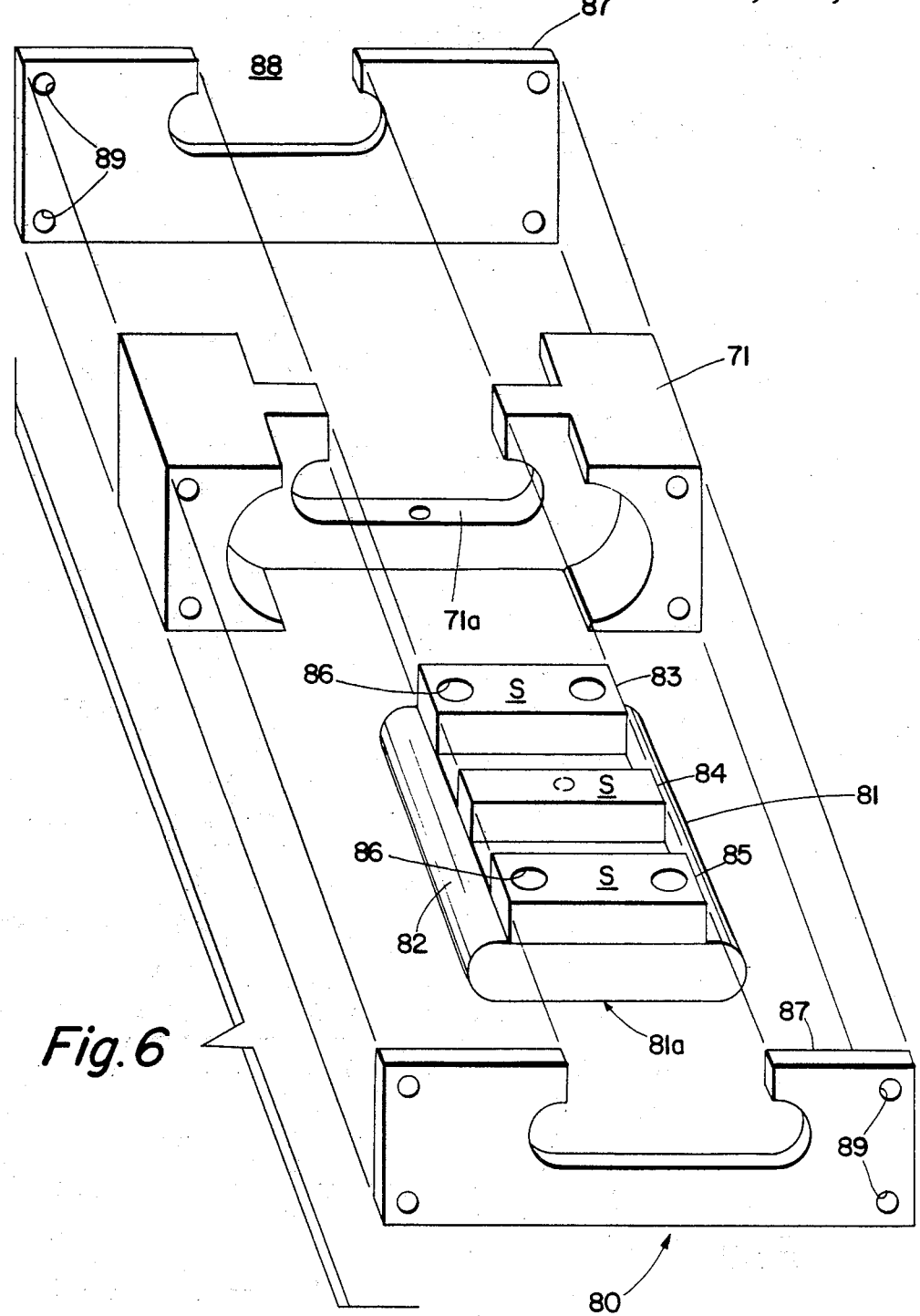

FIG. 6 is another alternate embodiment of a bearing assembly 80. In this embodiment, the frame member 71 of FIG. 5 may be used, but a race member or bearing block 81 is shaped generally in the shape of a recumbent "E" having a horizontal base or load section 82 and three projecting arms or mounting sections 83, 84, 85. Each of the arms may include mounting holes 86 as necessary for securing the race member 82 directly to a movable member (not shown). The race member 81 has a lower or load surface 81a which is flat to allow it, as the load bearing surface, to be ground flat in a single operation for the two races of recirculating roller bearings. The two tracks of roller bearing elements are separated on the lower, or load bearing surface, by the central spine 71a of the frame 71.

Side plates 87 for this embodiment are advantageously provided with an aperture 88 shaped to receive therein one of the arms 83, 85 and the cross section of the vertical member 82, with appropriate holes 89 to secure the side plate 87 to both the frame 71 and one of the arms 83, 85.

The upper surfaces of each of the arms 83, 84, 85 is ground to be of uniform height one to the other and parallel to the lower surface 81a of the race member 81, so that the load bearing surface is parallel with the mounting surface.

In many applications where performance objectives are paramount, the embodiment of FIG. 6 is believed to be preferred. This embodiment is believed, from a theoretical structural analysis, to provide the best bearing stiffness, with a more substantial securement of the load bearing surface to the mounting surface than any of the other designs. However, this design has some sacrifice in cost to manufacture because it lacks the simplicity of the other designs.

Figure 7:
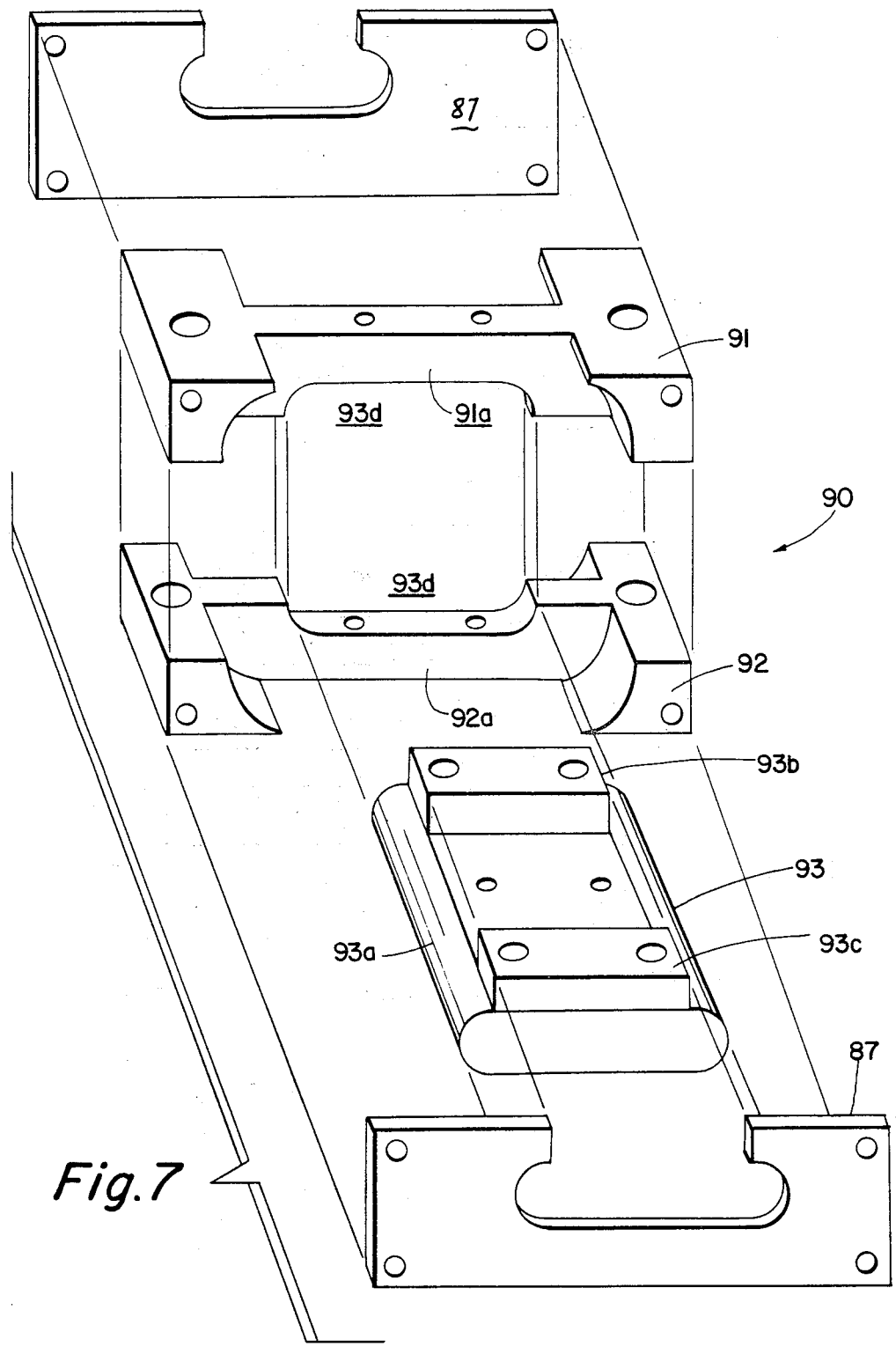

FIG. 7 is a perspective view of yet another embodiment of the bearing assembly 90. In this embodiment, a bearing frame is formed by two pieces 91, 92 which together form the shape of the frame or body member 20 of FIGS. 1-3. The race member 93 is in the shape of a "U" (or a recumbent "C", depending on viewpoint), having a horizontal base 93a with vertical end members 93b, 93c which define the outer upper portions of the roller track, with the spine 91a, 92a of the pieces 91, 92 respectively defining the central divider between roller tracks on both upper and lower paths. Each of the vertical end members 93b, 93c includes holes for mounting the race member 93 to the movable member. In this embodiment, the race member 93 must be positioned within its aperture 93d before the pieces 91, 92 are secured together.

Side plates 87 may be identical in design to those described in connecting with and pictured in FIG. 6.

Figure 8:
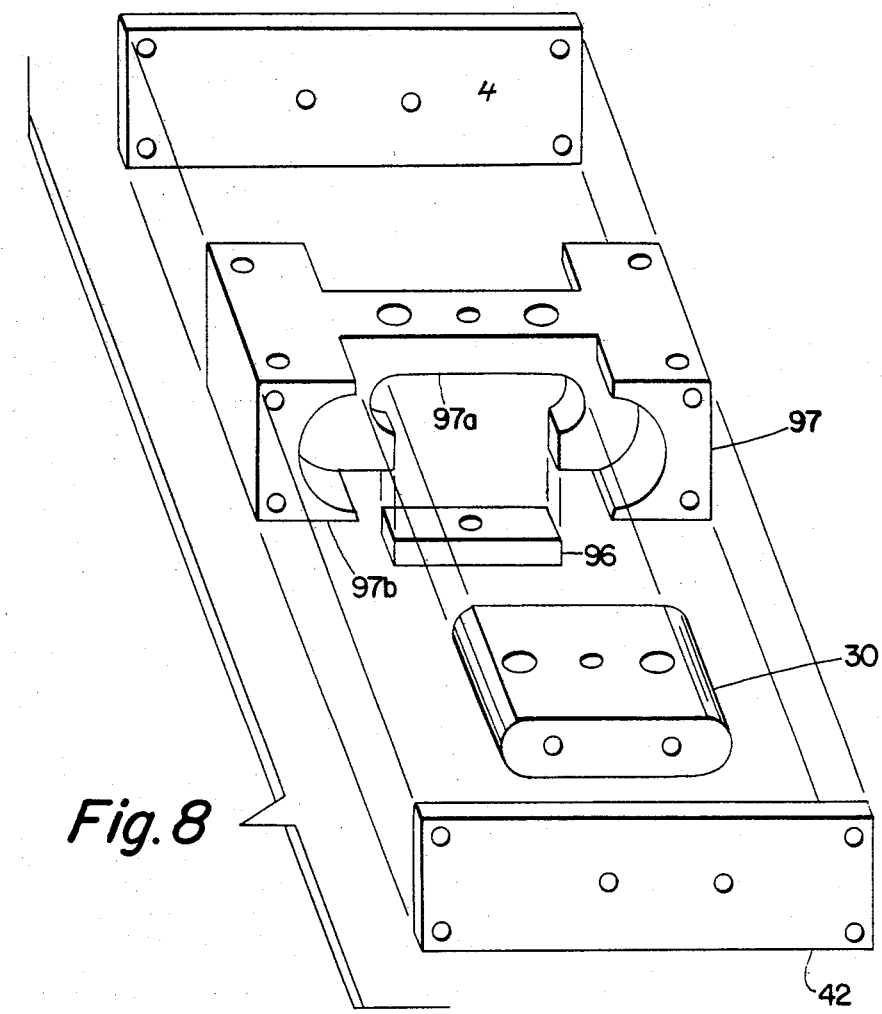

FIG. 8 illustrates another variation of the bearing embodiment of FIGS. 1-3 in which a portion 96 is removed from the spine of an I-shaped frame 97 to allow grinder access to a downwardly facing surface 97a. It is desirable that the surface 97a be ground both flat and parallel to the lower surface 97b of the frame so that the individual roller bearing elements are uniformly loaded when the load is applied and can roll under uniform load for high performance and long life. In this embodiment, the conventional race member 30 and side plate 42 as described in connection with FIGS. 1-3 are employed.

Figure 9:
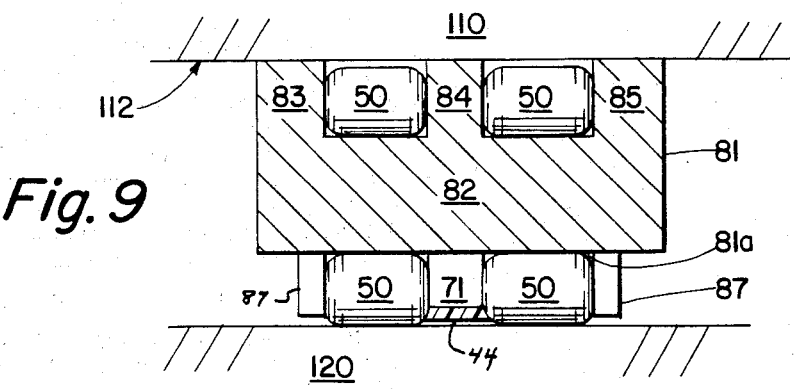
FIG. 9 is a cross-sectional view of the assembled bearing assembly of FIG. 6 mounted to a suitable portion of a movable member, taken generally along a line 9—9 in FIG. 6 looking in the direction of the arrows.

FIG. 9 illustrates the mounting of a bearing assembly 100 of FIG. 6 between a movable member 110 and a stationary member 120. The bearing assembly 100 includes the frame member 71, the race member 81 and side plates 87, with arms 83, 85 mounted to a lower surface 112 of the movable member 110. Roller bearing elements 50 surround the horizontal base 82 and engage by rolling along the upper surface of the stationary member 120. The lower surface 81a of the horizontal member 82 is under load from supporting the weight (and any other load) of the movable member 110.

In the foregoing discussions of direction, horizontal and vertical directions have been referenced. This is based upon the assumption that the bearing will be employed for lineal movement in a horizontal plane. If the bearing is mounted for vertical movement or for simultaneous movement in horizontal and vertical directions, suitable modifications of the descriptions of directions must be made.

Many modifications and substitutions to the preferred embodiment and the alternate embodiments described in the foregoing paragraphs are possible without departing from the spirit of the present invention. For example, the present invention contemplates that the individual roller bearing elements are crowned rollers, although other rolling elements could be used to advantage, with suitable modifications to the retaining structure such as retaining strip 44. Additionally, individual features of the present invention might be used to advantage without corresponding use of other features as disclosed. The end caps could be separately manufactured if desired, or the returns on the outer periphery of the races could be manufactured from separate pieces such as separate plastic inserts if desired. Accordingly, the present description of the preferred embodiment and selected alternate embodiments of the present invention should be considered as merely illustrative of the present invention, and not in limitation thereof. The present invention is defined solely by the following claims.

Having thus described the invention, what is claimed is:

1. A bearing assembly for use in supporting a pair of members for relative movement, said bearing assembly comprising first and second circuitous arrays of rotatable bearing elements disposed adjacent opposite sides of said bearing assembly, each of said arrays of bearing elements including a first linear group of bearing elements having outer side surfaces which roll on a surface of a first one of the members, a second linear group of bearing elements which extends parallel to the first linear group of bearing elements, and arcuate end groups of bearing elements extending between said first and second groups of bearing elements, one-piece bearing block means for engaging said arrays of bearing elements and transmitting a load applied against said bearing block means by the first linear group of bearing elements in each of said arrays of bearing elements to a second one of the members, said one-piece bearing block means including a load section having a continuous flat load surface which faces in a first direction toward the first linear group of bearing elements in each of said arrays of bearing elements, said load surface including a first surface area which is engaged by the first linear group of bearing elements in the first array of bearing elements, a second surface area which is engaged by the first linear group of bearing elements in the second array of bearing elements and a connector surface area which extends between the first and second surface areas, said load section of said bearing block means further including a third surface area which is disposed on a side of said load section opposite from and extends parallel to said first surface area and which is engaged by the second linear group of bearing elements in the first array of bearing elements, a fourth surface area which is disposed on a side of said load section opposite from and extends parallel to said second surface area and which is engaged by the second linear group of bearing elements in the second array of bearing elements, first and second arcuate end surface areas which extend between said first and third surface areas and are disposed at opposite ends of said load section in engagement with the arcuate end groups of bearing elements in said first array of bearing elements, and third and fourth arcuate end surface areas which extend between said second and fourth surface areas and are disposed at opposite ends of said load section in engagement with the arcuate end groups of bearing elements in said second array of bearing elements, said one-piece bearing block means further including mounting means which projects from a side of said load section opposite from said load surface and is adapted to be connected with the second one of the members, said mounting means being integrally formed as one piece with said load section of said bearing block means, said mounting means including a mounting section connected with said load section of said bearing block means at a location between said third and fourth surface areas and projecting from said load section in a second direction opposite from the first direction, said bearing assembly further including housing means for partially enclosing said first and second arrays of bearing elements and said bearing block means, said housing means including a frame having a central portion which engages said load section of said bearing block means and a pair of end portions which engage the arcuate end groups of bearing elements in said first and second arrays of bearing elements, said central portion of said frame having an open ended recess through which said load section of said one-piece bearing block means extends, said recess in said central portion of said frame having a flat side surface which faces in the second direction and is disposed in abutting engagement with said connector surface area on said load section, said recess having an opening through which said mounting section of said one-piece bearing block means extends in the second direction away from said flat side surface of said recess.

2. A bearing assembly as set forth in claim 1 wherein said mounting means includes a second mounting section connected with said load section at a location outwardly from said third surface area and said first array of bearing elements to transmit force from a first end portion of said load section to the second one of the members, and a third mounting section connected with said load section at a location outwardly from said fourth surface area and said second array of bearing elements to transmit force from a second end portion of said load section to the second one of the members.

3. A bearing assembly as set forth in claim 1 wherein said mounting section has a flat end surface which extends parallel to the connector surface area on said load section and is adapted to abuttingly engage the second member to position said load surface relative to the second member.

4. A bearing assembly as set forth in claim 1 wherein said central portion and said end portions of said frame are integrally formed as one piece.

* * * * *